United States Patent
Nam et al.

(10) Patent No.: US 9,040,193 B2
(45) Date of Patent: May 26, 2015

(54) CAP ASSEMBLY AND RECTANGULAR TYPE SECONDARY BATTERY HAVING THE CAP ASSEMBLY

(75) Inventors: Jung-Il Nam, Cheonan (KR); Heang-Lea Cho, Cheonan (KR); Young-Hoon Kim, Cheonan (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1021 days.

(21) Appl. No.: 10/216,273

(22) Filed: Aug. 12, 2002

(65) Prior Publication Data
US 2003/0059678 A1   Mar. 27, 2003

(30) Foreign Application Priority Data
Sep. 24, 2001   (KR) .................. 2001-59033

(51) Int. Cl.
| | |
|---|---|
| *H01M 2/04* | (2006.01) |
| *H01M 2/08* | (2006.01) |
| *H01M 2/30* | (2006.01) |
| *H01M 2/06* | (2006.01) |
| *H01M 10/04* | (2006.01) |
| *H01M 2/02* | (2006.01) |
| *H01M 2/12* | (2006.01) |

(52) U.S. Cl.
CPC ............ *H01M 2/065* (2013.01); *H01M 2/0478* (2013.01); *H01M 2/0217* (2013.01); *H01M 2/04* (2013.01); *H01M 2/1235* (2013.01); *H01M 10/0431* (2013.01)

(58) Field of Classification Search
CPC ..... H01M 2/065; H01M 2/0478; H01M 2/08; H01M 2/30
USPC ................. 429/175, 163, 181, 161; 29/623.1, 29/623.2, 623.3
See application file for complete search history.

(56) References Cited

U.S. PATENT DOCUMENTS

| | | | |
|---|---|---|---|
| 5,004,656 A | * | 4/1991 | Sato et al. ................ 429/162 |
| 5,279,907 A | | 1/1994 | Paterek et al. |
| 5,586,993 A | * | 12/1996 | Saito et al. .................. 29/623.2 |
| 6,076,017 A | * | 6/2000 | Taylor et al. ................ 607/36 |
| 6,117,586 A | * | 9/2000 | Kim et al. ................ 429/175 |
| 6,174,620 B1 | * | 1/2001 | Okada et al. ................ 429/176 |

(Continued)

FOREIGN PATENT DOCUMENTS

| | | | |
|---|---|---|---|
| JP | 59103273 A | | 6/1984 |
| JP | 60-041753 | | 3/1985 |

(Continued)

OTHER PUBLICATIONS

Adhesives, Sealants and Coatings for the Electronics Industry By: Flick, E.W. © 1992 William Andrew Publishing/Noyes p. 985.*

(Continued)

*Primary Examiner* — Karie O'Neill Apicella
(74) *Attorney, Agent, or Firm* — Robert E. Bushnell, Esq.

(57) ABSTRACT

In a cap assembly and a rectangular type secondary battery having the cap assembly, the cap assembly includes a cap plate made of a metallic or nonmetallic material, a hollow, low-melting point glass metal tube inserted into a hole formed in the cap plate, and a metallic or nonmetallic pin inserted into the hollow glass metal tube, wherein the cap plate, the glass metal tube and the pin are atomically bonded with one another at their contact areas by high-temperature heating.

20 Claims, 5 Drawing Sheets

(56) References Cited

U.S. PATENT DOCUMENTS 6,622,046 B2 * 9/2003 Fraley et al. .................. 607/36
2002/0058184 A1 * 5/2002 Hayashi et al. ............... 429/180

FOREIGN PATENT DOCUMENTS

| JP | 6-36209 | 5/1994 |
| JP | 07-226198 | 8/1995 |
| JP | 08329910 A | 12/1996 |
| JP | 2000228175 A | 8/2000 |
| JP | 2001-185100 | 7/2001 |
| JP | 2001-210284 | 8/2001 |
| KR | 1020010038477 A | 5/2001 |
| KR | 1020030005800 A | 1/2003 |

OTHER PUBLICATIONS http://www.azom.com, article titled Glass—An Overview.*
http://www.electro-glassprod.com/mozilla/prod/raw1.html.*
Cited in Korean Notice of Allowance dated on Jul. 25, 2007 issued by KIPO in connection with Korean Patent Application No. 10-2001-0059033. With Request for the Entry of the accompanying Office Action.
Office Action from the Japanese Patent Office issued in Applicant's corresponding Japanese Patent Application No. 2002-273629 dated Apr. 8, 2008.

* cited by examiner

CAP ASSEMBLY AND RECTANGULAR TYPE SECONDARY BATTERY HAVING THE CAP ASSEMBLY

CLAIM OF PRIORITY

This application makes reference to, incorporates the same herein, and claims all benefits accruing under 35 U.S.C. §119 from my application CAP ASSEMBLY AND RECTANGULAR-TYPE SECONDARY BATTERY THEREWITH filed with the Korean Industrial Property Office on Sep. 24, 2001 and there duly assigned Serial No. 2001-59033.

BACKGROUND OF THE INVENTION

1. Technical Field

The present invention relates to a cap assembly for a rectangular type battery and a rectangular type battery having the cap assembly, and more particularly, to a rectangular type battery having an improved sealing structure.

2. Related Art

In general, a secondary battery is capable of recharging and achieving miniaturization and large capacity. Typical secondary batteries currently being used include nickel-metal hydride (Ni-MH) batteries, lithium (Li) batteries and lithium ion (Li-ion) batteries. Secondary batteries are classified into cylindrical batteries and rectangular type batteries according to the appearance type. In a rectangular type battery, an electrode plate assembly is housed in a battery case of a rectangular solid type.

A rectangular type secondary battery has a rectangular case, an electrode plate assembly inside the case, and an electrode tab in the center portion of the electrode plate assembly and extending out from the electrode plate assembly toward a cap plate. An insulator is placed adjacent to the electrode plate assembly. The cap plate is adjacent to the insulator. A hollow gasket is placed into an orifice of the cap plate, and a pin is inserted into the gasket. The pin, gasket, cap plate, and insulator can be referred to as a cap assembly of the rectangular type secondary battery.

A cap assembly for a rectangular type secondary battery can have the following problems. First, a gasket provided to form a hermetically sealed structure is fixed by deformation of a lower end of a pin. One problem associated with the provision of the gasket is that controlling various conditions for a perfect sealing operation is not easy. Also, the use of the gasket for formation of a hermetically sealed structure and an insulator for insulation of a terminal plate increases the number of components and makes the manufacturing process complex. Further, a rise in the inner pressure of a case may cause the pin to protrude outward.

SUMMARY OF THE INVENTION

To solve the above problems and others, it is an object of the present invention to provide an improved cap assembly for a rectangular type secondary battery.

It is another object of the present invention to provide a rectangular type secondary battery having the improved cap assembly.

To achieve the above objects and others, the present invention proposes a cap assembly for a rectangular type secondary battery, including a cap plate made of a metallic or nonmetallic material, a hollow, low-melting point glass metal tube inserted into a hole formed in the cap plate, and a metallic or nonmetallic pin inserted into the hollow glass metal tube, wherein the cap plate, the glass metal tube and the pin are atomically bonded with one another at their contact areas by high-temperature heating.

The cap assembly may further include a deformation portion protruding at an end of the pin, the deformation portion being deformed for establishing an area for tab connection.

During the high-temperature heating, a ceramic sheet is preferably fitted into the outer side of the glass metal tube for preventing a direct contact between a jig for supporting the cap assembly and the glass metal tube.

Alternatively, during the high-temperature heating, a ceramic ring may be fitted into the outer side of the glass metal tube for preventing a direct contact between a jig for supporting the cap assembly and the glass metal tube.

Also, the present invention provides a cap assembly for a rectangular type secondary battery, including a cap plate made of a metallic or nonmetallic material, a hollow, synthetic resin tube inserted into a hole formed in the cap plate, and a metallic pin inserted into the hollow tube, wherein the tube is fixed to the cap plate while establishing electrical insulation and gas seal by deforming an end of the pin by spinning.

The cap assembly may further include an insulator washer installed between the end of the pin and the cap plate for preventing contact between the end of the pin and the cap plate, the insulator washer being fixed at a proper position with the tube when the end of the pin is deformed by spinning.

In accordance with another aspect of the present invention, there is provided a rectangular type secondary battery including an electrode plate assembly formed by winding a positive and a negative electrode and a separator sandwiched therebetween, a rectangular case for accommodating the electrode plate assembly, a cap plate made of a metallic or nonmetallic material for hermetically sealing the rectangular case, a hollow, low-melting point glass metal tube inserted into a hole formed in the cap plate, and a metallic or nonmetallic pin inserted into the hollow glass metal tube, wherein the cap plate assembly, the glass metal tube and the pin are atomically bonded with one another at their contact areas by high-temperature heating.

Also, the rectangular type secondary battery may further comprise a deformation portion protruding at an end of the pin, the deformation portion being deformed for establishing an area for tab connection so as to establish an electrical connection between the tab drawn out from one side of the positive electrode or negative electrode and the pin.

In accordance with still another aspect of the present invention, there is provided a rectangular type secondary battery including an electrode plate assembly formed by winding a positive and a negative electrode and a separator sandwiched therebetween, a rectangular case for accommodating the electrode plate assembly, a cap plate made of a metallic or nonmetallic material for hermetically sealing the rectangular case, a hollow, synthetic resin tube inserted into a hole formed in the cap plate, and a metallic pin inserted into the hollow synthetic resin tube, wherein the tube is fixed to the cap plate while establishing electrical insulation and gas seal by deforming an end of the pin by spinning.

To achieve these and other objects in accordance with the principles of the present invention, as embodied and broadly described, the present invention provides a cap assembly for a battery, the assembly comprising: a cap plate including a material selected from among a metallic material and a nonmetallic material, said cap plate forming an orifice; a tube inserted into the orifice of said cap plate, said tube being hollow and being formed of glass and metal; and a pin inserted into said tube, said pin including a material selected from among a metallic material and a nonmetallic material; said cap plate, tube and pin being bonded with each other at their contact areas by heating.

To achieve these and other objects in accordance with the principles of the present invention, as embodied and broadly described, the present invention provides a cap assembly for a battery, the assembly comprising: a cap plate including a material selected from among a metallic material and a nonmetallic material, said cap plate forming an orifice; a tube inserted into the orifice of said cap plate, said tube being hollow and being formed of synthetic resin; and a pin inserted into said tube, said pin including a metallic material, said tube being fixed to said cap plate by deforming an end of said pin by a spinning process.

To achieve these and other objects in accordance with the principles of the present invention, as embodied and broadly described, the present invention provides a battery, comprising: an electrode plate assembly formed by winding a positive electrode and a negative electrode separated by a separator; a battery case accommodating said electrode plate assembly; a cap plate including a material selected from among a metallic material and a nonmetallic material, said cap plate forming an orifice, said cap plate hermetically sealing said battery case; a tube inserted into the orifice of said cap plate, said tube being hollow and being formed of glass and metal; and a pin inserted into said tube, said pin including a material selected from among a metallic material and a nonmetallic material; said cap plate, tube, and pin being bonded together at their respective contact areas by heating.

To achieve these and other objects in accordance with the principles of the present invention, as embodied and broadly described, the present invention provides a battery, comprising: an electrode plate assembly formed by winding a positive electrode and a negative electrode separated by a separator; a battery case accommodating said electrode plate assembly; a cap plate including a material selected from among a metallic material and a nonmetallic material, said cap plate forming an orifice, said cap plate hermetically sealing said battery case; a tube inserted into the orifice of said cap plate, said tube being hollow and being formed of a synthetic resin; and a pin inserted into said tube, said pin including a metallic material, said tube being fixed to said cap plate by deforming an end of said pin by a spinning process.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE INVENTION

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions, constructions, and configurations are not described in detail since they could obscure the invention with unnecessary detail. It will be appreciated that, in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Figure 1:
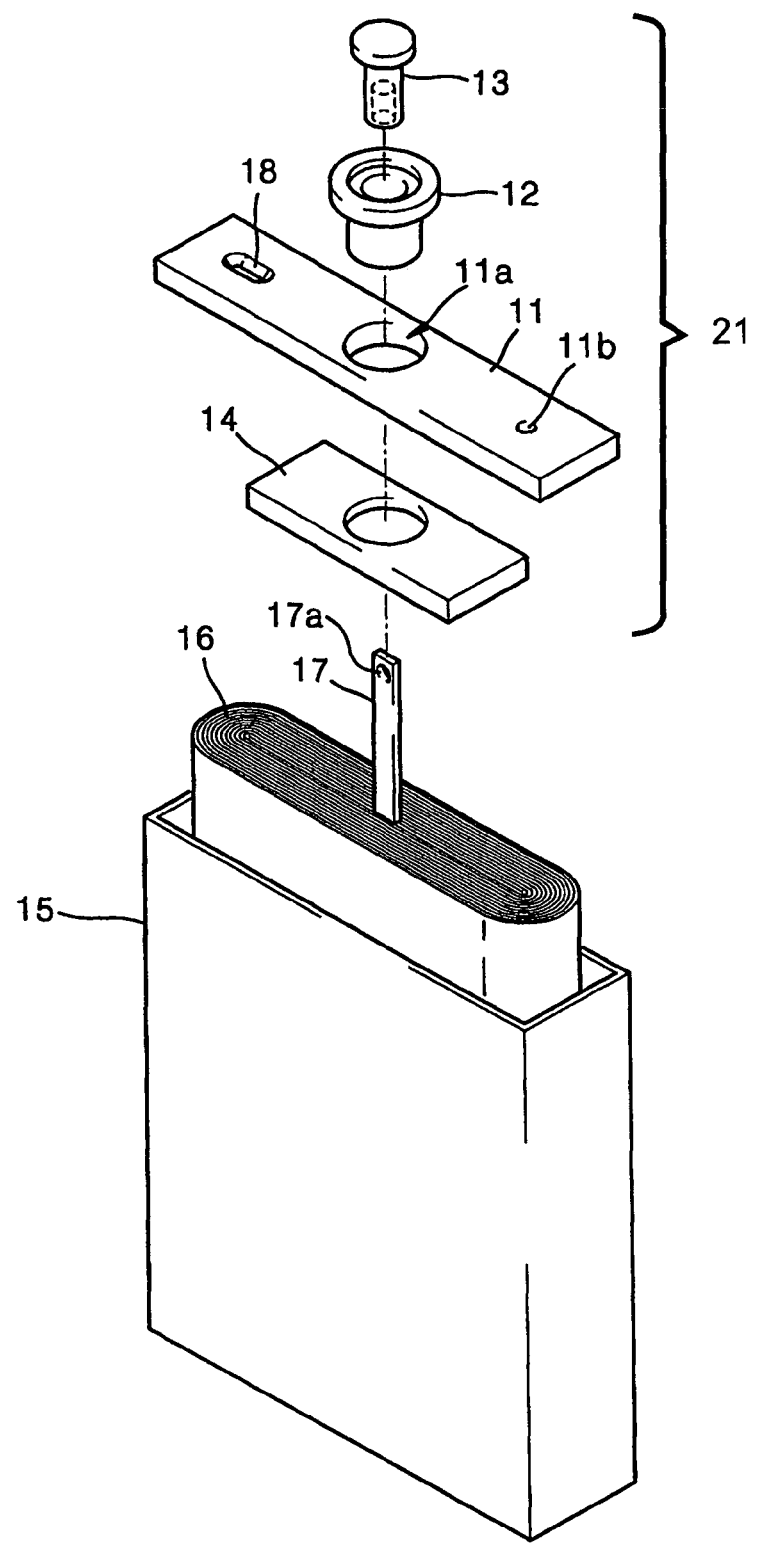
FIG. 1 is a schematic exploded perspective view of a rectangular type secondary battery.

FIG. 1 is a schematic exploded perspective view of a rectangular type secondary battery. Referring to FIG. 1, a case 15 defines the space of a rectangular solid and an electrode plate assembly 16 is housed in the case 15. The electrode plate assembly 16 is formed by laminating a positive electrode and a negative electrode, each coated with an electrode active material and insulated from each other by a separator sandwiched therebetween, followed by winding them together in a jelly-roll manner.

In other words, the electrode assembly 16 is formed by creating a three-layer unit. The three-layer unit is created by placing a positive electrode onto the top of a separator, and then placing a negative electrode beneath the separator. The separator serves to electrically insulate the positive electrode from the negative electrode. The three layer unit is then wound around a center axis. This forms the electrode assembly 16 of a battery, as shown in FIG. 1.

An electrode tab 17 is formed at one side of the electrode plate assembly 16. The electrode tab 17 is electrically connected to either the positive electrode or the negative electrode.

A cap assembly includes a cap plate 11 for hermetically sealing the top portion of the case 15, a gasket 12 inserted into a hole 11a formed in the cap plate 11, a pin 13 inserted into a hole formed in the gasket 12 and electrically connected with the tab 17 of the electrode plate assembly 16, and an insulator 14 for electrically insulating the tab 17 and the cap plate 11.

Figure 2:
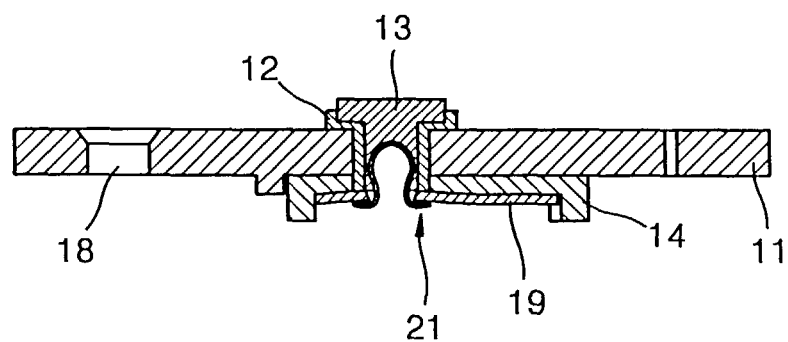
FIG. 2 is a cross-sectional view of a cap assembly for the rectangular type secondary battery shown in FIG. 1.

FIG. 2 is a cross-sectional view of a cap assembly 21 for the rectangular type secondary battery shown in FIG. 1. Referring to FIG. 1 and FIG. 2, an end 17a of the tab 17 is welded to a terminal plate 19. The terminal plate 19 is shown in FIG. 2. The terminal plate 19 is brought into contact with an end of the pin 13 to establish an electrical connection therebetween. The end of the pin 13 has a hollow portion, which is for a spinning operation to be described later. Reference numeral 11b in FIG. 1 identifies an opening for filling the case 15 with an electrolytic solution. That is to say, after the cap plate 11 is assembled to the top portion of the case 15, an electrolytic solution is deposited in the case 15 through the opening 11b, followed by sealing with a plug (not shown). Reference numeral 18 identifies a safety valve for preventing the explosion of the battery in such a manner that it is opened when inner pressure of the battery rises.

Referring to FIG. 1 and FIG. 2, the pin 13 is inserted into the hollow gasket 12. The hollow gasket 12 is inserted into the hole 11a of cap plate 11. The gasket 12 can prevent gas or electrolytic solution from leaking out of the battery case through the hole 11a. The end of the pin 13 is inserted into a hole formed in the insulator 14 and into a hole formed in the terminal plate 19. The lower end of the pin 13 is deformed for maintaining a fixed state. Also, the end 17a of the tab 17 is welded to the terminal plate 19. In such a manner, the tab 17, the terminal plate 19 and the pin 13 are electrically connected with one another. The insulator 14 prevents the terminal plate 19 from contacting the cap plate 11. The lower end of the pin 13 is deformed by a suitable process such as by spinning, as shown in FIG. 2, and the insulator 14 and the terminal plate 19 are pressed toward the cap plate 11, thereby ensuring a securely fixed state. As is well known, spinning is an operation for widening the lower end of the pin 13 in a mold while rotating the pin 13.

The above-described cap assembly for a rectangular type secondary battery has the following problems. First, the gasket 12 provided to form a hermetically sealed structure is fixed by deformation of the lower end of the pin 13. One problem associated with the provision of the gasket 12 is that controlling various conditions for a perfect sealing operation is not easy. Also, the use of the gasket 12 for formation of a hermetically sealed structure and the insulator 14 for insulation of the terminal plate 19 increases the number of components and makes the manufacturing process complex. Further, a rise in the inner pressure of the case 15 may cause the pin 13 to protrude outward.

Figure 3:
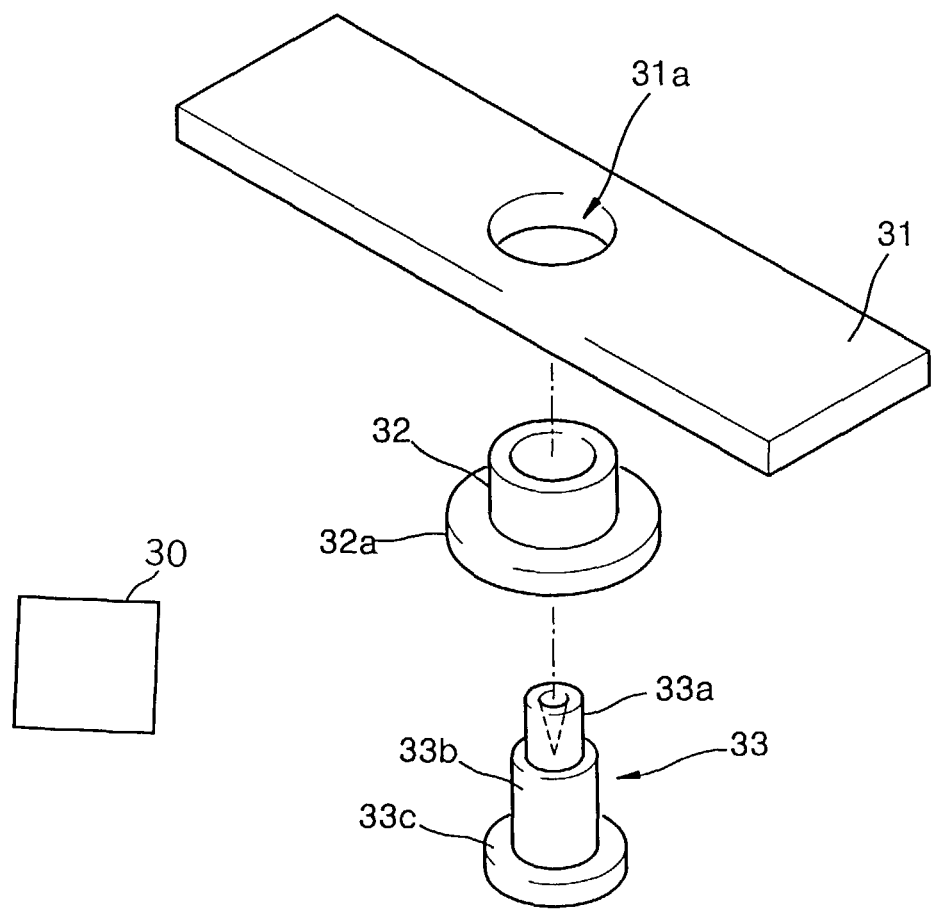
FIG. 3 is a schematic exploded perspective view of a cap assembly for a rectangular type secondary battery in accordance with a first embodiment of the present invention.

FIG. 3 is a schematic exploded perspective view of a cap assembly for a rectangular type secondary battery in accordance with a first embodiment of the present invention. FIG. 3 shows an inverted state of a cap assembly for a rectangular type secondary battery. Referring to FIG. 3, the cap assembly is inverted relative to the cap assembly shown in FIG. 1 for convenient viewing. The case 15 containing the electrode plate assembly 16 shown in FIG. 1 is connected to the upper portion of a cap plate 31, and the tab 17 is brought into contact with the top portion of a pin 33 made of either metallic material or nonmetallic material, for the case of the cap assembly shown in FIG. 3.

In FIG. 3, a hollow glass metal tube 32 is inserted into a hole 31a formed in the cap plate 31. The pin 33 is inserted into the hollow glass metal tube 32. While the cap plate 31 and the pin 33 are formed of a conductive, metallic or non-metallic material, the glass metal tube 32 is formed of a glass metal. A suitable material for the glass metal is prepared by mixing pulverized or particulate glass having a melting point of 400 degrees Celsius (° C.) or below and a metal, and gelling the mixture. The glass metal becomes non-conductive and solid when exposed to high-temperature heating. The glass metal material can form a seal by an atomic bond with other metallic materials. Also, the glass metal material can be made in the form of a tube by being extrusion-molded in a pulverized state. Then, the glass metal material can form a seal with a metallic material through high-temperature heating. The high-temperature heating is performed in the temperature range of 400 degrees Celsius to 1000 degrees Celsius (° C.).

Before being subjected to high-temperature heating, the cap plate 31 and the assembly of the glass metal tube 32 and the pin 33 are supported using a jig 30. The features of the jig 30 are not shown in fine detail in FIG. 3 because jigs of this type are known in the art, and because the details of the jig 30 do not constitute a significant portion of the present invention.

A flange 32a is formed at one side of the glass metal tube 32. The glass metal tube 32 can form an atomic bond with metallic materials of the cap plate 31 and the pin 33 when it is heated at high temperature. Thus, in a state in which the glass metal tube 32 is inserted into the hole 31a of the cap plate 31 and the pin 33 is inserted into the glass metal tube 32, the structure is subjected to high-temperature heating to establish an atomic bond between each of the glass metal tube 32, the metallic or nonmetallic pin 33 and the cap plate 31, thereby forming a hermetically sealed structure.

The pin 33 is constructed such that a head 33c is formed at one end of a body 33b and a deformation portion 33a is formed at the other end of the body 33b. The head 33c is exposed outside a completed rectangular secondary battery so as to be connected to an external circuit. The deformation portion 33a has a conical groove inside and can be deformed by an external force so as to be connected to the tab 17 (see FIG. 1) of the electrode plate assembly 16 by a suitable connection method, such as welding. In another embodiment of the present invention, the deformation portion 33a may have a plain surface without a conical groove.

Figure 4A:
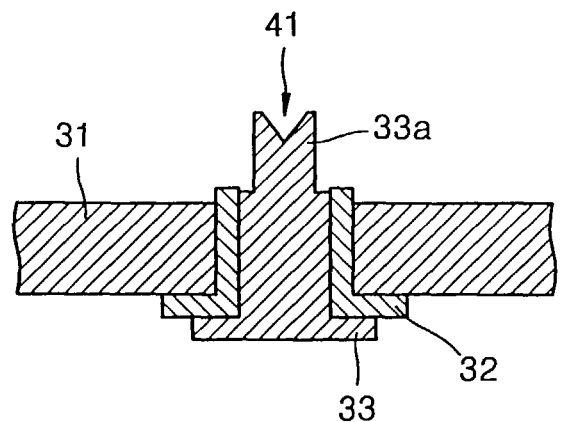
FIGS. 4A and 4B are cross-sectional views for explaining a method of making the cap assembly shown in FIG. 3 in accordance with the principles of the present invention.
Figure 4B:
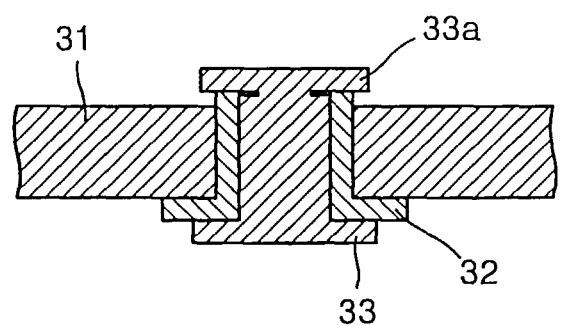

FIGS. 4A and 4B are cross-sectional views for explaining a method of making the cap assembly shown in FIG. 3 in accordance with the principles of the present invention. Referring to FIG. 4A, the outer surface of the glass metal tube 32 is in contact with the inner surface of a hole formed in the cap plate 31. The pin 33 is inserted into the hole of the glass metal tube 32 so that the outer surface of the pin 33 is in contact with the inner surface of the glass metal tube 32. Reference numeral 41 denotes a conical space formed in the deformation portion 33a of the pin 33. The conical space is provided for facilitating the deformation of the deformation portion 33a. Although not shown, in another embodiment of the present invention, the deformation portion 33a may not have a conical space but may have a plain surface.

Referring to FIG. 4B, the glass metal tube 32, the metallic cap plate 31 and the pin 33 are atomically bonded to one another by high-temperature heating. Here, the cap plate 31 and the pin 33 are electrically insulated from each other due to the insulating property of the glass metal tube 32. Also, since the deformation portion 33a formed at one end of the pin 33 is deformed by an external force, a wider area for being connected to the tab 17 is thereby secured.

A more secured connection state can be attained by using a material having good bondability with respect to glass. For example, nickel has relatively good bondability with respect to glass compared to other metals. Thus, a more secured connection state can be achieved such that the cap plate 31 and the pin 33 may be formed of nickel or a nickel-coated layer is formed at a contact portion with the glass metal tube 32.

Meanwhile, in the case where a lead (Pb) component is contained in glass, there is a difficulty in manufacture of the assembly. In more detail, before being subjected to high-temperature heating, the cap plate 31 and the assembly of the glass metal tube 32 and the pin 33 are supported using a jig 30 shown in FIG. 3. The glass metal tube 32 and the jig 30 are bonded to each other due to a carbonaceous component contained in the jig 30 and are not easily separated from each other. Even if the glass metal tube 32 and the jig are separated, a poor outer appearance may be resulted. To overcome this problem, a ceramic material may be used.

Figure 5:
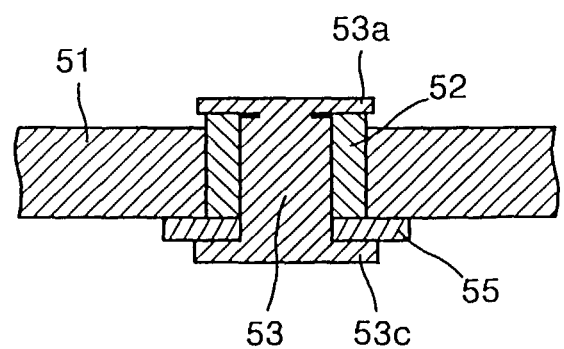
FIG. 5 is a schematic cross-sectional view of a cap assembly for a rectangular type secondary battery in accordance with a second embodiment of the present invention.

FIG. 5 is a schematic cross-sectional view of a cap assembly for a rectangular type secondary battery in accordance with a second embodiment of the principles of the present invention. Referring to FIG. 5, a glass metal tube 52 is inserted into a hole formed in a cap plate 51. Unlike in FIG. 3, the glass metal tube 52 is in the shape of a hollow cylinder without a flange. A ceramic sheet 55 has a hole in its center, and a pin 53 is inserted into the hole of the ceramic sheet 55. The ceramic sheet 55 is located adjacent to a head 53c and comes into contact with a jig 30 when the cap assembly is heated, thereby preventing the glass metal tube 52 from directly contacting the jig 30. A deformation portion 53a is deformed by an external force, as described with reference to FIGS. 3 through 4B, thereby securing an area for connection of a tab.

Figure 6:
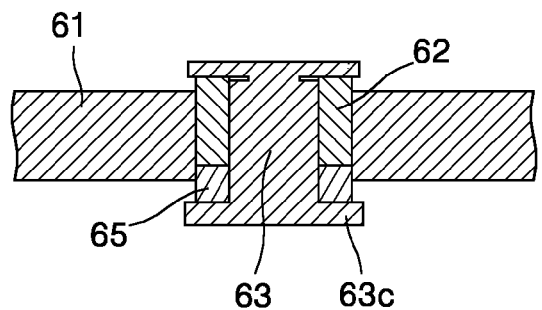
FIG. 6 is a schematic cross-sectional view of a cap assembly for a rectangular type secondary battery in accordance with a third embodiment of the present invention.

FIG. 6 is a schematic cross-sectional view of a cap assembly for a rectangular type secondary battery in accordance with a third embodiment of the present invention. A ceramic ring 65 is used in the third embodiment shown in FIG. 6. Referring to FIG. 6, a glass metal tube 62 is inserted into a hole formed in a cap plate 61. Similarly as in FIG. 5, the glass metal tube 62 is shaped as a hollow cylinder. The ceramic ring 65 has a hole in its center, and a pin 63 is inserted into the hole of the ceramic ring 65. The ceramic ring 65 is located adjacent to a head 63c and comes into contact with a jig 30 when the cap assembly is heated, thereby preventing the glass metal tube 62 from directly contacting the jig.

The ceramic sheet 55 in FIG. 5 can be referred to as a "ceramic unit." The ceramic ring 65 in FIG. 6 can also be referred to as a "ceramic unit."

Figure 7:
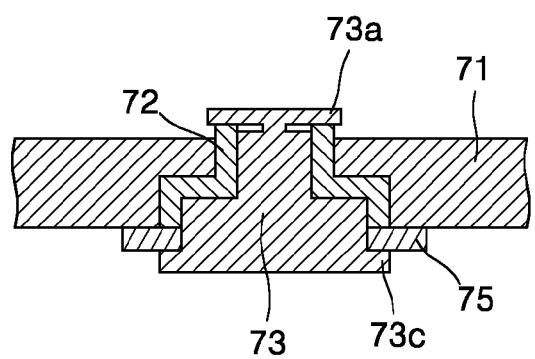
FIG. 7 is a schematic cross-sectional view of a cap assembly for a rectangular type secondary battery in accordance with a fourth embodiment of the present invention.

FIG. 7 is a schematic cross-sectional view of a cap assembly for a rectangular type secondary battery in accordance with a fourth embodiment of the present invention. In the fourth embodiment shown in FIG. 7, a glass metal tube is formed stepwise. Referring to FIG. 7, a glass metal tube 72 is formed stepwise, and the inner surface of a hole formed in a cap plate 71 and the outer surface of a pin 73 are configured to conform thereto. The stepped shape of the glass metal tube 72 allows the glass metal tube 72 to contact the cap plate 71 and the pin 73 over a wider area. Also, a passage through which gas in the battery case flows out is made curved, thereby enhancing a sealing effect. Additionally, it is possible to prevent jig 30 from directly contacting the glass metal tube 72 by using a ceramic sheet 75. The pin 73 has a head 73c. A deformation portion 73a is formed at one end of the pin 73 in the same manner as described above.

In the embodiments described with reference to FIGS. 3 through 7, sealing and insulation effects are achieved through atomic bond by interposing a tube made of glass between a cap plate and a pin. On the other hand, a tube may be formed of a synthetic resin such as fluoride resin and a sealed structure may be formed using the tube.

Figure 8A:
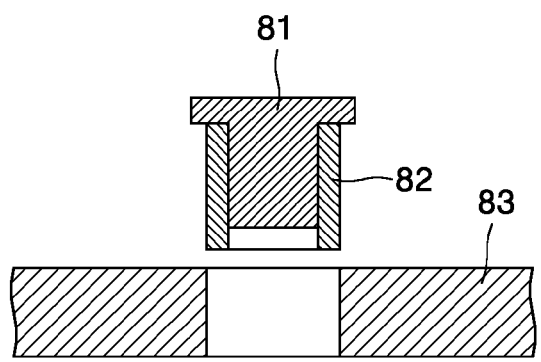
FIGS. 8A through 8C are cross-sectional views for explaining a method for making a cap assembly using a synthetic resin tube in accordance with the principles of the present invention.
Figure 8B:
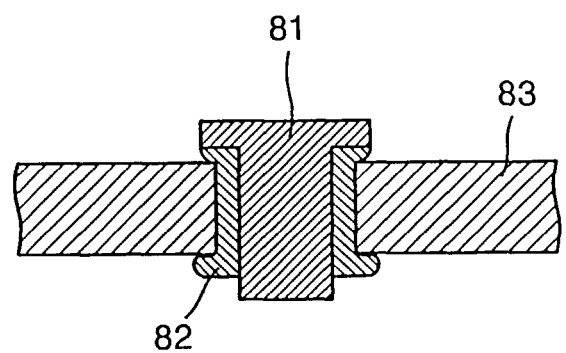
Figure 8C:
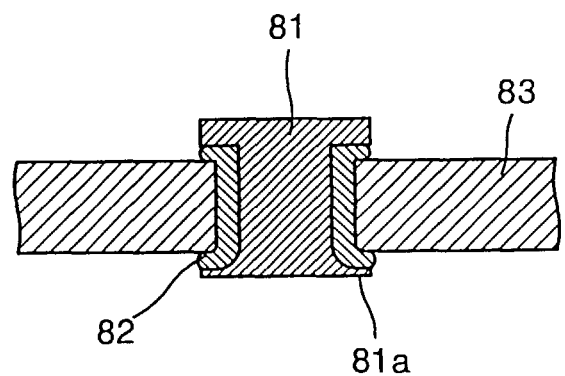

FIGS. 8A through 8C are cross-sectional views for explaining a method of making a cap assembly using a synthetic resin tube in accordance with the principles of the present invention. Referring to FIG. 8A, a pin 81 may be formed of a metallic or nonmetallic material, and a tube 82 may be formed of a synthetic fluoride resin. As shown in the drawing, the tube 82 is cylindrically shaped. As shown in FIG. 8B, the pin 81 is inserted into a hole formed in a cap plate 83 while pressing the tube 82. A sealed structure can be formed between the pin 81 and the cap plate 83 by pressing for insertion of the pin 81. Thereafter, as shown in FIG. 8C, the pin 81 can be securely fixed by deforming an end 81a of the pin 81 through a spinning process. A tab (not shown) of an electrode plate assembly is directly welded to the end 81a of the pin 81.

Figure 9:
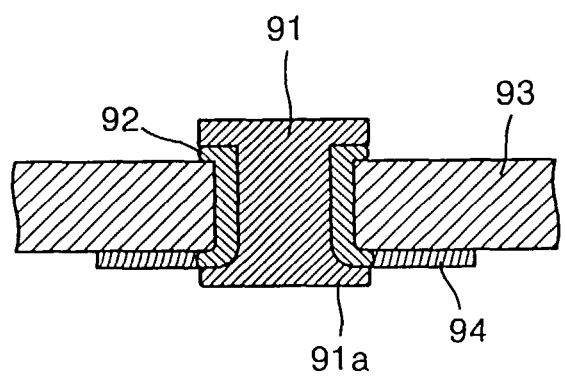
FIG. 9 shows a modification of the cap assembly shown in FIGS. 8A through 8C in accordance with the principles of the present invention.

FIG. 9 shows a modification of the cap assembly shown in FIGS. 8A through 8C in accordance with the principles of the present invention. More specifically, FIG. 9 shows a modification of the cap assembly shown in FIGS. 8A through 8C, in which an insulator washer 94 is further provided for preventing contact between an end 91a of a pin 91 and a cap plate 93. The washer 94 can be fixed at a proper position with a tube 92 made of a synthetic fluoride resin, when the end 91a of the pin 91 is deformed by spinning.

The cap assembly according to the present invention and the rectangular type secondary battery having the same have advantages in that a sealed structure of the cap assembly is formed in a secure manner and the manufacture thereof is easy. Also, since the number of components for the cap assembly is reduced, the manufacturing cost can be reduced.

The foregoing paragraphs describe the details of a cap assembly for a rectangular type secondary battery and a rectangular type secondary battery having the same, and more particularly, a rectangular type secondary battery having an improved sealing structure, and a rectangular type secondary battery having the cap assembly.

While this invention has been particularly shown and described with reference to preferred embodiments thereof, it will be understood by those skilled in the art that various changes in form and details may be made therein without departing from the spirit and scope of the invention as defined by the appended claims.

While the present invention has been illustrated by the description of embodiments thereof, and while the embodiments have been described in considerable detail, it is not the intention of the inventors to restrict, or in any way limit the scope of, the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the general inventive concept.

What is claimed is:

1. A cap assembly for a battery, the cap assembly comprising;
    a cap plate, said cap plate perforated by an orifice;
    a nonconductive glass metal tube inserted into the orifice of said cap plate, said tube being hollow and being formed of a gelled mixture of a particulate glass and metal, the mixture being hardened by heat to form the glass metal tube;
    a pin inserted through said tube, said tube, said cap plate and said pin being atomically bonded together along their respective contact areas; and a ring positioned to surround the orifice and terminate one end of said tube and separate the cap plate from a head of the pin that terminates the pin, and laterally opposite sides of the ring respectively engaging the head of the pin and an edge of the cap plate defining a periphery of the orifice, respectively.

2. The cap assembly of claim 1, the battery comprising a rectangular secondary battery.

3. The cap assembly of claim 1, comprised of said ring comprising a flange of said tube extending radially outwardly from the orifice.

4. The cap assembly of claim 1, said ring comprising a ceramic unit fitted at one side of said cap plate to extend radially outwardly from the orifice and to cover a base surface of the tube and obstruct direct contact between said cap plate and the head terminating said pin.

5. The cap assembly of claim 4, wherein said head further comprises:
a deformation portion protruding at an end of said pin, said deformation portion being deformed when said pin is inserted into said tube, said deformation portion establishing an area for connection with a tab of the battery.

6. The cap assembly of claim 5, said deformation portion securely fixing a position of said pin when said deforming is performed.

7. The cap assembly of claim 1, wherein said head father comprises:
a deformation portion protruding at an end of said pin, said deformation portion being deformed when said pin is inserted into said tube, said deformation portion establishing an area for connection with a tab of the battery.

8. The cap assembly of claim 7, said deformation portion securely fixing a position of said pin when said deforming is performed.

9. The cap assembly of claim 4, wherein said tube, said cap plate and said pin are atomically bonded together along their respective contact areas by high-temperature heating being performed in a range of 400 to 1000 degrees Celsius (° C.).

10. A battery, comprising:
an electrode plate assembly formed by winding a positive electrode and a negative electrode separated by a separator;
a battery case for accommodating said electrode plate assembly; and
a cap assembly;
said cap assembly comprising:
a cap plate, said cap plate perforated by an orifice, said cap plate hermetically sealing said battery case;
a nonconductive tube inserted through the orifice of said cap plate, said tube being a hollow and being formed of glass and metal;
a pin terminated by a head, the pin being inserted through said tube said cap plate, said tube, and said pin being atomically bonded together at their respective contact areas by high-temperature heating; and
a ring positioned to extend beyond a junction formed by a periphery of the orifice and the cap plate and terminate one end of said tube and separate the cap plate from a head of the pin that terminates the pin, and laterally opposite sides of the ring respectively engaging the head of the pin and an edge of the cap plate defining a periphery of the orifice, respectively.

11. The battery of claim 10, said tube having a low-melting point.

12. The battery of claim 11, the battery comprising a rectangular secondary battery, and said battery case being rectangular in shape.

13. The battery of claim 10, further comprising:
a tab of the battery, said tab being coupled to one of the positive electrode and the negative electrode; and
a deformation portion protruding at an end of said pin, said deformation portion being deformed when said pin is inserted into said tube, said deformation portion establishing an area for connection with said tab to establish an electrical connection between said tab and said pin.

14. The battery of claim 13, said deformation portion securely fixing a position of Said pin when said deforming is performed.

15. The battery of claim 14, said tube having a low-melting point.

16. The battery of claim 15, the battery comprising a rectangular secondary battery, and said battery case being rectangular in shape.

17. The cap assembly of claim 1, wherein said ring is selected from the group consisting of a ceramic ring and a flange encircling said tube.

18. The cap assembly of claim 1, said cap plate, said tube and said pin being bonded together at their contact areas by heating.

19. The battery of claim 10, wherein said ceramic unit is selected from the group consisting of a ceramic ring and a ceramic sheet.

20. The battery of claim 10, said cap plate, said tube and said pin being bonded together at their contact areas by heating.

* * * * *